Nov. 28, 1967 D. W. BOENSEL ETAL 3,355,668

TUNABLE NOTCH FILTER

Filed Sept. 30, 1963 2 Sheets-Sheet 1

INVENTORS
DONALD W. BOENSEL
ARNOLD C. KNUDSEN

BY Fraser and Bogucki

ATTORNEYS

TUNABLE NOTCH FILTER

Filed Sept. 30, 1963 2 Sheets-Sheet 2

INVENTORS
DONALD W. BOENSEL
ARNOLD C. KNUDSEN
BY
Fraser and Bogucki
ATTORNEYS

United States Patent Office 3,355,668
Patented Nov. 28, 1967

3,355,668

TUNABLE NOTCH FILTER

Donald W. Boensel, La Canada, and Arnold C. Knudsen, San Fernando, Calif., assignors, by mesne assignments, to The Bendix Corporation, a corporation of Delaware Filed Sept. 30, 1963, Ser. No. 312,706
16 Claims. (Cl. 328—167)

ABSTRACT OF THE DISCLOSURE

A tunable notch filter circuit for cancelling an unwanted component from an input signal. Generated in synchronism with the unwanted component is a signal, the frequency and phase of which are such as to oppose the unwanted component and cancel that component when combined with the input signal. The phase of the generated signal is controlled by comparing it with the phase of the unwanted component while the amplitude of the generated signal is adjusted in accordance with the degree to which the unwanted component remains after combination of the generated and input signals.

This invention relates to electrical filtering circuits of the rejection type and more particularly to such circuits which are tunable over a predetermined range in order to reject an undesired signal of a preselected frequency.

In most communication systems, the reception of a signal of a particular frequency or band of frequencies is of primary consideration. Often, however, the reception of a desired signal is interfered with by the presence of noise or other signals which fall within the frequency pass band of the desired signal. The elimination or substantial attenuation of the undesired signals or noise materially improves the reception of the desired signal. Various arrangements are known for filtering out the undesired signals, either by passing the entire input signal through a network designed to pass the desired signal while rejecting the undesired signal or by bypassing the undesired signal to ground. Most such arrangements employ filtering circuits of one type or another to achieve the desired result.

Filter circuits which are designed to reject a particular frequency signal while passing the remaining signals in a band of frequencies are called notch filters, because of the shape of the operating characteristic of the filter. In such filters, the notch corresponds to a very narrow frequency band encompassing the particular frequency of the signal to be rejected. However, should the undesired signal drift slightly in frequency, it may move outside the limits of the notch and thus no longer be rejected by the filter. Moreover, a notch filter designed to reject a particular frequency is not readily adaptable to use in rejecting unwanted signals at other frequencies.

It is therefore a general object of the present invention to provide an improved rejection or notch filter circuit.

It is a further object of the present invention to provide a notch filter which is tunable over a predetermined range.

It is a still further object of the present invention to provide a tunable notch filter which is capable of tracking a particular unwanted signal to which it is tuned in order to compensate for any possible drift in the undesired signal.

In brief, the present invention involves a signal generator which is controlled to provide a given signal of a frequency and phase corresponding to an input signal which is to be rejected. Suitable rejection circuitry is provided for combining the generated signal with the input signal in such a way that the unwanted signal is cancelled from the input signal. In this way an output signal is developed which corresponds to the input signal except that it is substantially free of the undesired signal component and any modulation components of the unwanted signal which fall within the rejection band of the notch filter. It will be understood that such modulation components within the rejection band are included in expressions employed herein in designating the unwanted signal.

In accordance with the invention, the signal generator employs a tunable voltage controlled oscillator (VCO) which is operated as part of a phase-locked loop to which the input signal is applied. The voltage controlled oscillator is tuned to the frequency of the undesired signal. The output frequency of the voltage controlled oscillator is thereafter maintained in synchronism with the undesired signal by virtue of control of the VCO by an error signal developed in a multiplier which receives inputs from the input signal and from the voltage controlled oscillator for comparison. Thus, as the unwanted signal may drift slightly in frequency, the voltage controlled oscillator is made to follow this drift so that its output is always precisely of the proper phase to be combined with the input signal in order to eliminate the unwanted signal component therefrom.

In an arrangement as thus far described, it is conceivable, where the desired and undesired signals are relatively close together in frequency, that the undesired signal may drift sufficiently close to the desired signal as to cause the filter to actually reject the wanted signal. In accordance with a particular aspect of the present invention, the bandwidth of the voltage controlled oscillator in responding to the error signal from the multiplier may be limited in order to prevent the circuit from tracking an undesired signal to the point where the notch of the filter encompasses the desired signal frequency. In accordance with a further aspect of the invention, the voltage controlled oscillator is arranged to be tunable over a considerable frequency range in order that the arrangement may have wider adaptation and utility. A further aspect of the present invention provides a variable control in the rejection circuitry which determines the characteristics of the filter in rejecting amplitude modulated signals. A variable control of the bandwidth of the phase-locked loop is also provided in order to permit adjustment of the frequency range over which the tunable VCO might lock onto a particular signal. This also provides a control over the frequency rate of change which may be tracked by the filter. In addition, a variable threshold circuit is included to provide an indication of the lock condition in the phase-locked loop and to disable the rejection circuitry in the event that the loop is not in lock.

A better understanding of the present invention may be had from a consideration of the following detailed description, taken in conjunction with the accompanying drawings, in which.

The circuits employed in individual stages of the depicted arrangement are known in the prior art and it is not deemed necessary to describe the details thereof. Accordingly, for the sake of simplicity, the arrangements of the present invention are represented in block diagram form.

Figure 1:
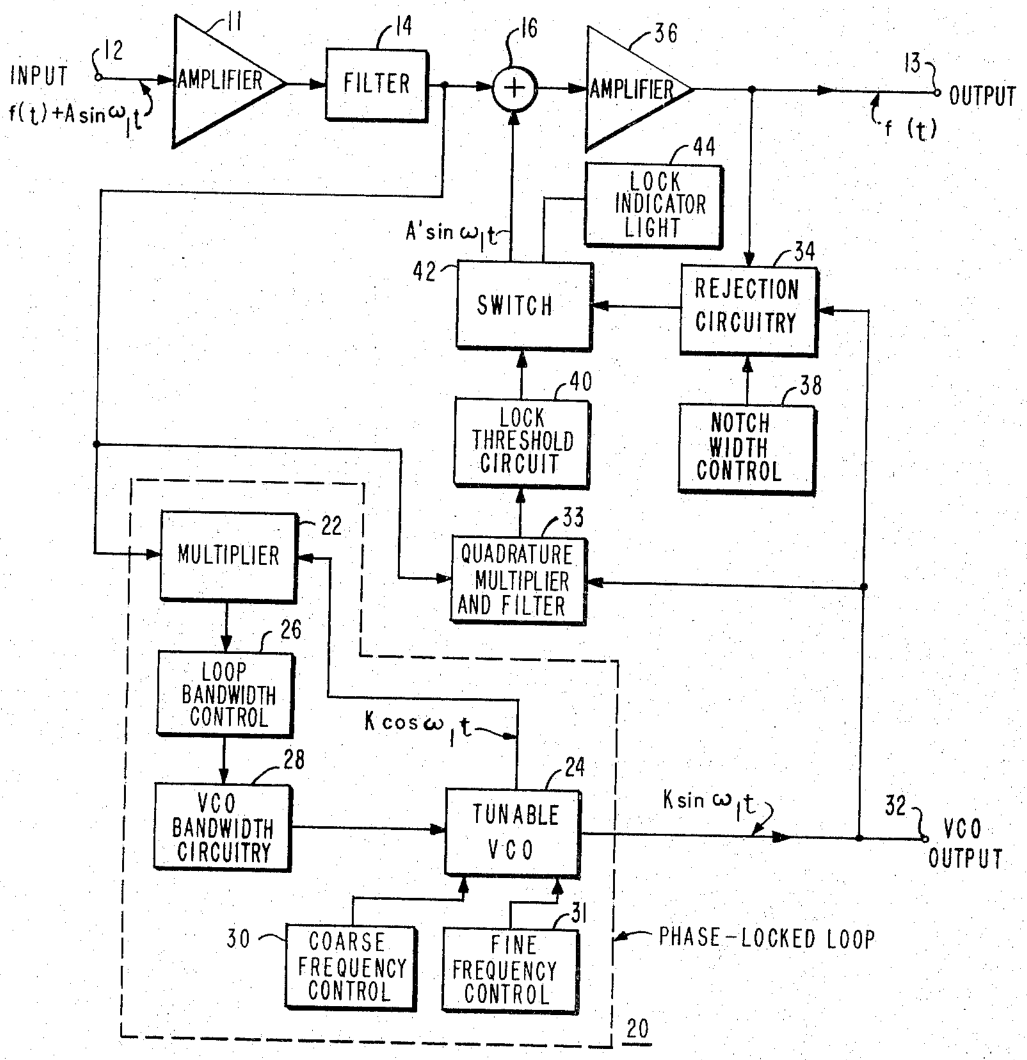
FIG. 1 is a block diagram of one particular arrangement in accordance with the present invention.

In FIG. 1, which represents one particular arrangement in accordance with the invention, an amplifier 11 is shown coupled to an input terminal 12 to which received signals including the particular undesired signal may be applied. The output of the amplifier 11 is directed to a filter 14 having an operating characteristic which will pass a band of frequencies including the desired signal. It is assumed that the undesired signal is also within this band. In one particular arrangement in accordance with the invention which is designed to operate in the lower end of the frequency spectrum, the filter 14 has a low pass characteristic with a cutoff frequency of ten kilocycles (kc.) per second. The band of signals passed by the filter 14 is directed in parallel to a summing network 16, to a quadrature multiplier and filter stage 33, and to a phase-locked loop 20 which includes a multiplier 22 and a turnable voltage controlled oscillator 24. The mutliplier 22 may be a four quadrant true analog multiplier which gives true mutliplication of inputs having frequency components ranging from DC to 10 kc. The multiplier 22 develops at its output an error voltage which is proportional in amplitude to the cosine of the phase difference of the two frequencies which are applied to its inputs for comparison. A loop bandwidth control stage 26 follows the multiplier 22 for controlling the bandwidth of the phase-locked loop 20. The error signal from the multiplier 22, filtered by the loop bandwidth control, is fed through VCO bandwidth circuitry 28 before being applied to the tunable VCO 24. The circuitry 28 will be described in further detail in connection with FIGS. 3 and 4. The tunable VCO 24 may be tuned in frequency over a range from 5 to 5000 cycles per second (c.p.s.) by means of coarse and fine frequency controls 30 and 31 respectively, shown coupled thereto.

The tunable VCO 24 is arranged to provide as dual outputs a pair of signals identical in frequency and amplitude but 90° out-of-phase with respect to each other. In the described embodiment of the invention, these signals are sine waves for use in cancelling like signals from the frequency band present at the input terminal 12. One of the output signals from the tunable CVO 24 is fed back to the multiplier 22 to complete the phase-locked loop 20. The remaining signal, in quadrature with the first signal, is applied to a VCO output terminal 32 and is also directed to rejection circuitry 34. The rejection circuitry 34 is connected in a feedback loop across an amplifier 36 which is coupled to the output of the summing circuit 16. A notch width control stage 38 is shown connected to the rejection circuitry 34 in order to provide a variable control of the width of the notch provided by the tunable notch filter represented in FIG. 1. A particular circuit arrangement is provided to disable the rejection circuit loop and to provide an indication to an operator in the event that the phase-locked loop 20 is not in lock; that is, in the event that the output frequency of the tunable VCO 24 is not maintained in synchronism with the particular signal which is to be rejected. This includes a lock threshold circuit 40 coupled to receive a signal proportional to the input amplitude of the unwanted signal from the quadrature multiplier and filter stage 33 in order to control a switch 42 in series with the rejection circuitry 34. The switch 42 also serves to energize a lock indicator light 44, thus providing an indication of whether or not the phase-locked loop 20 is in lock. The threshold circuit 40 has a variable threshold adjustment so that it may be controlled in accordance with the amplitude of the unwanted signal at the input terminal 12. Because of the quadrature relationship of the inputs to the respective circuits 22 and 33, the voltage applied to the lock threshold circuit 40 is a maximum when the error voltage from the multiplier 22 is a minimum, corresponding to the lock condition of the phase-locked loop 20.

Figure 2:
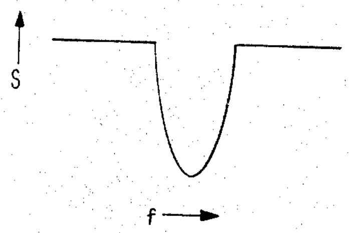
FIG. 2 is a typical response curve of the tunable notch filter of the invention.

The operating characteristic of the tunable notch filter of FIG. 1 is represented in FIG. 2 as a function of signal strength S with respect to frequency $f$. For a band of applied input signals, the output is proportional to the input except for a very narrow rejection band or notch in which the output is severely attenuated. In arrangements in accordance with the present invention, the position of the notch in the received frequency band is variable as the device is tuned over the band. Thus the invention may be controlled to reject a given unwanted signal of a particular frequency while passing other signals unattenuated. Moreover, because the tunable VCO 24 is controlled in response to an error signal from the multiplier 22 to track the particular unwanted signal, the notch or rejection band of the tunable notch filter may vary within limits as the unwanted signal drifts in frequency.

Arrangements in accordance with the present invention have the capability of functioning to reject unwanted signals of a general type; that is, signal components falling within the classes of amplitude modulation, phase modulation, and frequency modulation may be rejected with equal effectiveness within the rejection band of the tunable notch filter. A general expression of an input signal to the notch filter might be $$f(t)+A(t)\sin[\omega_1 t+\phi(t)+\omega(t)]$$

where the second term represents the undesired signal including any possible type of modulation which may appear. However, for simplicity, the operation of the depicted embodiment of the invention will be described in terms of an input signal $f(t)+A\sin\omega_1 t$ applied to the input terminal 12 wherein $A\sin\omega_1 t$ represents an unwanted signal component of a particular frequency. It will be understood that the unwanted signal may have other components than those shown in this example.

The input signal at the terminal 12 is inverted by the amplifier 11 and after filtering in the filter 14 is passed to the multiplier 22. The tunable VCO 24 is tuned by means of the frequency controls 30 and 31 to the frequency $\omega_1$ and thus provides quadrature output signals of $K\cos\omega_1 t$ and $K\sin\omega_1 t$. The cosine signal is applied to the second input of the multiplier 22, completing the phase-locked loop 20. The remaining output signal, $K\sin\omega_1 t$, is applied to the rejection circuitry 34 where it is appropriately adjusted in amplitude in accordance with the output fed back from the output terminal 13 and, assuming the phase-locked loop 20 is in lock so that the switch 42 is closed, the output of the rejection circuitry 34 is a signal $A'\sin\omega_1 t$ of an appropriate amplitude and phase for combining with the input signal present at the summing circuit 16 so as to cancel the undesired signal $A\sin\omega_1 t$. The result is a signal $f(t)$ at the output terminal 13 representing the input signal minus the undesired signal component. Control of the bandwidth of the phase-locked loop 20 is provided by means of a control network 26. This affects the lead-lag time constants of the filter network in the loop bandwidth control circuit 26, and adjustment thereof serves to improve the lock characteristics of the phase-locked loop 20.

Figure 3:
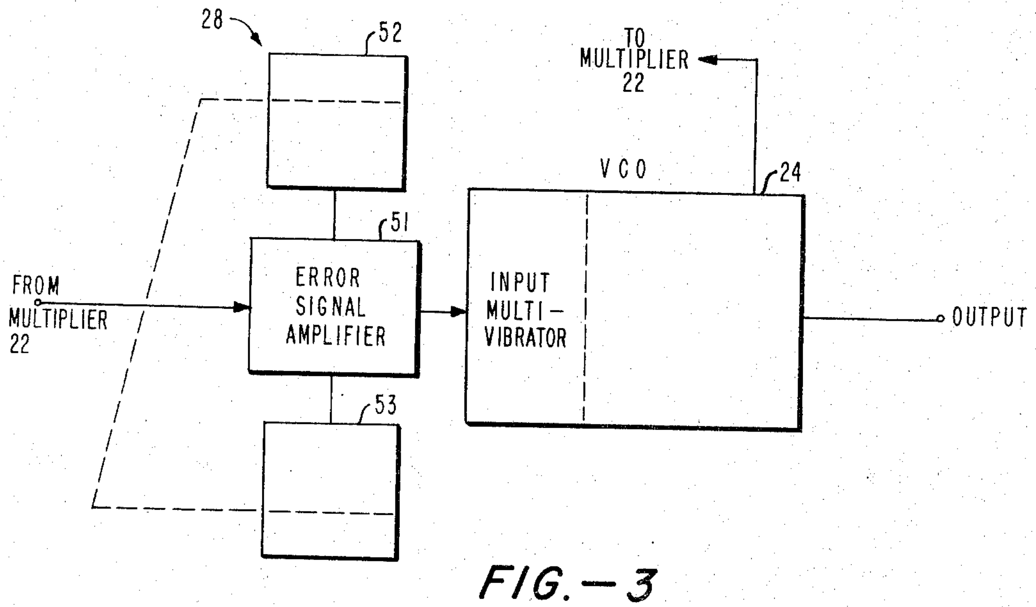
FIG. 3 is a block diagram of a particular portion of the arrangement shown in FIG. 1.
Figures 4, 5:
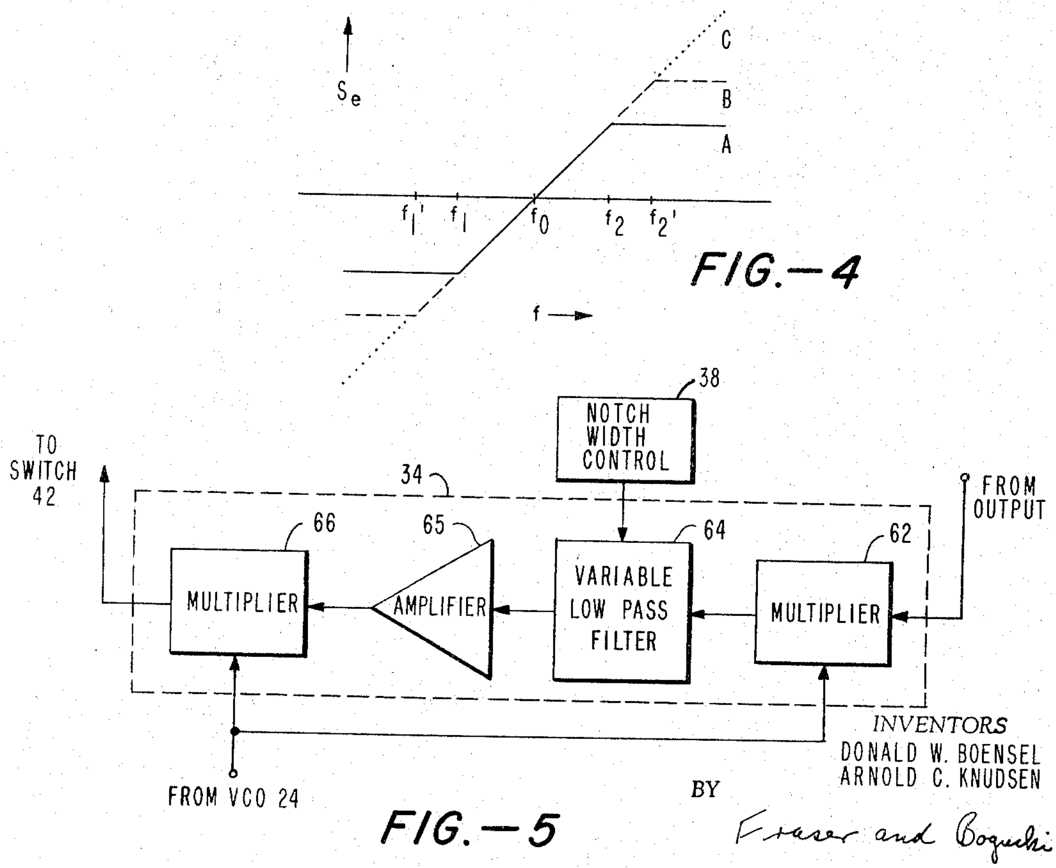
FIG. 4 is a diagram representing response curves for various settings of the circuit shown in FIG. 3.
FIG. 5 is a block diagram of another portion of the arrangement shown in FIG. 1.

A portion of the circuit of FIG. 1 including the VCO bandwidth circuitry 28 is shown in greater detail in FIG. 3 and its operation is explained in conjunction with the diagram of FIG. 4. In conventional phase-locked loop circuits, the error voltage of the multiplier or phase detector serves to control the associated voltage controlled oscillator so as to follow any particular signal within the lock range or loop bandwidth of the circuit. In the present invention, however, such an operating characteristic could unfortunately limit the effectiveness of the tunable notch filter in rejecting unwanted signals which are particularly close to a desired signal frequency. Accordingly, particular VCO bandwidth circuitry 28 is provided to limit the excursion of the tunable VCO 24 from its frequency setting in response to an error signal from the multiplier 22. This is shown in FIG. 3 as comprising an error signal amplifier 51 coupled between a pair of variable clamping circuits 52 and 53 which are ganged together in their operation. By selecting a particular setting of the circuits 52 and 53, the error signal which is passed from the multiplier 22 to the input multivibrator stage of the tunable VCO 24 is limited to a pre-selected amplitude. Thus the tunable VCO 24 is limited in its excursion from the frequency setting of its associated frequency controls 30 and 31. The effect of limiting the error signal in this manner can be better appreciated by reference to the diagram of FIG. 4 which shows different characteristics for different settings of the variable clamping circuits 52 and 53. FIG. 4 is a diagram of error signal amplitude $S_e$ plotted with respect to frequency about a particular frequency $f_o$ to which the tunable VCO 24 is tuned. With the VCO bandwidth circuitry 28 set to limit the excursion of the VCO 24 between the frequencies $f_1$ and $f_2$, the error signal which is applied to the VCO from the bandwidth circuitry 28 corresponds to the solid line designated A in FIG. 4. For a different setting of the bandwidth circuitry 28 to permit an excursion of the VCO 24 between the frequency limits $f_1'$ and $f_2'$, a characteristic corresponding to the dashed line designated B in FIG. 4 is selected. Finally, if the error signal from the multiplier 22 is not limited by the VCO bandwidth circuitry 28, a characteristic represented by the dotted line designated C in FIG. 4 results. Thus by means of this arrangement, the tunable notch filter may be enabled to operate close to a particular desired signal present at the input without the danger of the notch drifting over and capturing the desired signal.

FIG. 5 represents the rejection circuitry 34 of FIG. 1 in somewhat greater detail. In this particular arrangement in accordance with the invention, the rejection circuitry 34 is represented as comprising an input true analog multiplier 62 coupled to receive the output signal from the amplifier 36 of FIG. 1. The output of the multiplier 62 is applied to a low pass filter 64 having a variable bandpass characteristic controlled by the notch width control circuit 38. The output of the filter 64 is directed to a DC amplifier 65 and thence to a second true analog multiplier 66. Both of the multipliers 62 and 66 also receive an input signal from the VCO 24 of FIG. 1. The output of the multiplier 66 is directed to the switch 42 of FIG. 1 which controls the application of the rejection signal to the summing circuit 16.

The multiplier 62 of FIG. 5 multiplies the output signal from the amplifier 36 with the signal K sin $\omega_1 t$ from the VCO 24. In the usual case, the product of $f(t)$ and K sin $\omega_1 t$ contains no components which fall within the pass band of the low pass filter 64. Thus the output of the filter 64, amplified in the amplifier 65 is proportional to the amplitude of the unwanted signal which may be present in the output of the amplifier 36. This, when multiplied by the signal K sin $\omega_1 t$ from the VCO 24 in the multiplier 66, automatically adjusts the amplitude of the resulting rejection signal by providing a term in the coefficient of the product which results in virtually complete elimination of the unwanted signal from the output signal $f(t)$. The rejection signal, shown in FIG. 1 as A' sin $\omega_1 t$, is thereby adjusted in amplitude and phase so as to cancel out the unwanted signal from the filter 14 through combination in the summing circuit 16. The result is a narrow notch of controllable width in the transfer characteristic of the tunable notch filter, which notch may be controlled in frequency to occur at a pre-selected point in the frequency band of the circuit and which is permitted to automatically track a selected unwanted signal as the latter drifts over a particular frequency range. This cancellation of the unwanted signal results with substantially no distortion or other interference with other signals in the frequency band of operation.

Although there has been described hereinabove one particular arrangement of a tunable notch filter in accordance with the invention in order to illustrate significant aspects of the invention in exemplary fashion, it will be understood that the invention is not intended to be limited thereto. Accordingly, any and all modifications, variations or equivalent arrangements falling within the scope of the annexed claims should be considered to be a part of the invention.

What is claimed is:

1. A tunable notch filter comprising means for receiving input signals having an unwanted component, signal generating means and a multiplier connected in a phase-locked loop and coupled to receive said unwanted component for phase comparison, and means for combining a signal generated by the signal generating means with the received input signal in order to effect a cancellation of the unwanted component thereof.

2. A tunable notch filter comprising means for receiving an input signal including an unwanted component thereof, a tunable oscillator, a multiplier, means coupling the oscillator and the multiplier in a phase-locked loop in order to permit control of the frequency of the oscillator by an error voltage developed in the multiplier within predetermined frequency limits, means for coupling the unwanted component of the input signal to an input of the multiplier for establishing the output of the oscillator in synchronism therewith, and means for applying the output of the oscillator to the input signal with such a phase and amplitude relationship as to cancel the unwanted component therefrom.

3. A tunable notch filter comprising means for receiving an input signal including an unwanted component thereof, a tunable oscillator including means for developing at least two quadrature output signals at a selected frequency, a multiplier, means coupling one output of the oscillator to the multiplier in a phase-locked loop in order to permit control of the frequency of the oscillator by an error voltage developed in the multiplier within predetermined frequency limits, means for coupling the unwanted component of the input signal to an input of the multiplier for establishing the output of the oscillator in synchronism therewith, and means for applying a second output of the oscillator to the input signal with such a phase and amplitude relationship as to cancel the unwanted component therefrom.

4. A tunable notch filter comprising a signal path having input and output terminals, the input terminal being adapted to receive an input signal having an unwanted component, a tunable voltage controlled oscillator and a multiplier coupled together in a phase-locked loop, means connecting the signal path to one input of the multiplier, means for tuning the voltage controlled oscillator to the frequency of the unwanted signal component, means coupled to the voltage controlled oscillator for limiting the bandwidth thereof relative to the frequency to which it is tuned, means for applying an output of the voltage controlled oscillator to the signal path for combination with the input signal with a phase and amplitude such as to cancel the unwanted component, and means for disabling the voltage controlled oscillator output applying means in the event that the phase-locked loop is not in lock.

5. A tunable notch filter comprising a signal path having input and output terminals, the input terminal being adapted to receive an input signal having an unwanted component, a tunable voltage controlled oscillator and a multiplier coupled together in a phase-locked loop, means connecting the signal path to one input of the multiplier in order to develop an error voltage proportional to the cosine of the phase difference between the signals applied to the multiplier, means for tuning the voltage controlled oscillator to the frequency of the unwanted signal component, means coupled to the voltage control oscillator for limiting the error voltage applied to the voltage controlled oscillator from the multiplier, means for applying an output of the voltage controlled oscillator to the signal path for combination with the signal with a phase and amplitude such as to cancel the unwanted component, and means for disabling the voltage controlled oscillator output applying means in the event that the phase-locked loop is not in lock.

6. A tunable notch filter comprising a signal path having input and output terminals, the input terminal being adapted to receive signals having an unwanted component therein, a phase-locked loop having signal generating means maintained in synchronism with the unwanted component of the received signal, and rejection circuitry connected to the output of the signal generating means for adjusting the amplitude of the generated signal to a value which produces cancellation of the unwanted component from the input signal.

7. A tunable notch filter in accordance with claim 6 wherein said rejection circuitry comprises means for varying the rejection bandwidth of the tunable notch filter for amplitude modulated signals.

8. A tunable notch filter in accordance with claim 7 wherein said bandwidth varying means comprises a variable low pass filter and means coupled thereto for adjusting the pass characteristics of said low pass filter.

9. A tunable notch filter comprising means for receiving an input signal having an unwanted component, means for generating a signal in synchronism with said uwanted component and of a frequency and phase such as to cancel out said unwanted component, means responsive to the input signal for controlling the signal generating means to track the unwanted signal component over a drift in frequency, means for adjusting the amplitude of said generated signal, and means for combining said generated signal with said input signal so as to cancel the unwanted component therefrom.

10. A tunable notch filter comprising means for receiving an input signal having an unwanted component, means for generating a signal in synchronism with said uwanted component and of a frequency and phase such as to cancel out said unwanted component, means for limiting the excursion of the generated signal from a preselected frequency, means for adjusting the amplitude of said generated signal, and means for combining said generated signal with said input signal so as to cancel the unwanted component therefrom.

11. A tunable notch filter comprising means for receiving input signals including an unwanted component, a signal generator, a multiplier connected to the signal generator in a phase-locked loop and coupled to receive said unwanted signal component for phase comparison, means for indicating when the phase-locked loop is in lock, and means for combining a signal generated by the signal generator with the received signal in order to effect a cancellation of the unwanted component thereof.

12. A tunable notch filter comprising means for receiving input signals including an unwanted component, a signal generator, a multiplier connected to the signal generator in a phase-locked loop and coupled to receive said unwanted signal component for phase comparison, means for indicating when the phase-locked loop is in lock, means for combining a signal generated by the signal generator with the received signal in order to effect a cancellation of the unwanted component thereof, and means for disabling the signal combining means when the phase-locked loop is not in lock.

13. A tunable notch filter in accordance with claim 12 wherein the disabling means includes an adjustable threshold setting means.

14. A tunable notch filter in accordance with claim 13 wherein the disabling means further includes a quadrature multiplier coupled to receive the input signal and said signal generated by the signal generator to develop a lock indication signal for application to the adjustable threshold setting means.

15. A tunable notch filter comprising a signal path having input and output terminals and an input amplifier, a filter, a summing circuit and an output amplifier connected in series between the input and output terminals; a multiplier having dual inputs, a first one of which is connected to receive a signal from the output of said filter; a tunable voltage controlled oscillator capable of generating dual output signals in phase quadrature, one of said output signals being coupled to the other input of the multiplier; means for tuning the voltage controlled oscillator to a selected frequency corresponding to a particular component of the signal present at said first input of the multiplier; means for applying an error voltage from the multiplier to the tunable voltage controlled oscillator to cause said oscillator to maintain a fixed phase relationship to said particular signal component; a rejection circuit connected in a feedback loop with said output amplifier; means for applying a quadrature output signal from the voltage controlled oscillator to the rejection circuit, said rejection circuit including means for adjusting the amplitude of said quadrature signal to eliminate said particular component from the output of said signal path; means coupled between the rejection circuit and the summing circuit for selectively applying the adjusted quadrature signal to the summing circuit; a quadrature multiplier connected to the filter and to the voltage controlled oscillator; and threshold control means connected between the quadrature multiplier and the selective applying means for energizing the selective applying means in the event of a voltage from the quadrature multiplier in excess of a predetermined level.

16. A tunable notch filter in accordance with claim 15 wherein the means for applying an error voltage from the multiplier to the tunable voltage controlled oscillator includes adjustable voltage limting means for selectively limiting the excursion of the oscillator signal from a preset frequency.

References Cited

UNITED STATES PATENTS

| | | | |
|---|---|---|---|
| 3,204,047 | 3/1965 | Trost et al. | 328—165 |
| 3,241,077 | 3/1966 | Smyth et al. | 328—165 |

ARTHUR GAUSS, *Primary Examiner.*

R. H. EPSTEIN, J. JORDAN, *Assistant Examiners.*

UNITED STATES PATENT OFFICE

CERTIFICATE OF CORRECTION

Patent No. 3,355,668 November 28, 1967

Donald W. Boensel et al.

It is hereby certified that error appears in the above numbered patent requiring correction and that the said Letters Patent should read as corrected below.

Column 3, line 17, for "turnable" read -- tunable --; column 6, line 72, for "control" read -- controlled --; column 8, line 48, for "limting" read -- limiting --.

Signed and sealed this 25th day of February 1969.

(SEAL)
Attest:

Edward M. Fletcher, Jr.
Attesting Officer

EDWARD J. BRENNER
Commissioner of Patents